United States Patent Office 3,009,952
Patented Nov. 21, 1961

3,009,952
PREPARATION OF HALOGENATED
ISOPHTHALIC ACIDS
Aubrey A. Larsen, Schodack, N.Y., assignor to Sterling Drug Inc., New York, N.Y., a corporation of Delaware
No Drawing. Original application Apr. 17, 1957, Ser. No. 653,287. Divided and this application July 6, 1959, Ser. No. 824,955
3 Claims. (Cl. 260—518)

This invention relates to the preparation of halogenated aromatic acids and in particular is concerned with the preparation of compounds having the formula

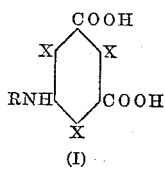

(I)

wherein R represents hydrogen or a lower-alkanoyl radical, and X represents a halogen atom selected from bromine and iodine.

When R in the above general Formula I represents a lower-alkanoyl radical, it stands for the acyl radical of a lower fatty acid having preferably from one to about six carbon atoms. The lower-alkanoyl radical can be straight or branched and includes such radicals as formyl, acetyl, propionyl, butyryl, isobutyryl, valeryl, caproyl, and the like.

The compounds of the invention are prepared by methods set forth in the following reaction scheme:

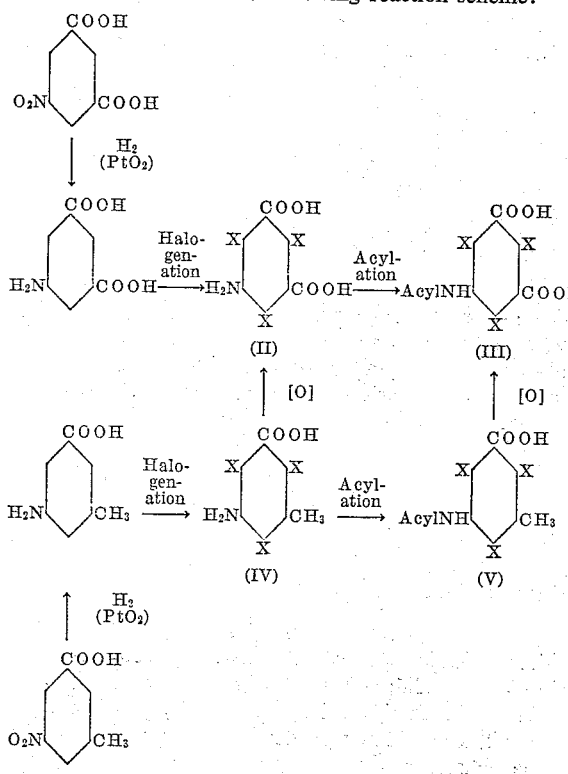

According to one series of reactions, 5-nitroisophthalic acid is reduced to 5-aminoisophthalic acid, preferably by catalytic means, e.g., in the presence of platinum oxide. The 5-aminoisophthalic acid is then exhaustively halogenated to introduce three bromine or iodine atoms, giving a 2,4,6-trihalo-5-aminoisophthalic acid (II). The latter is then acetylated to yield a 2,4,6-trihalo-5-acylaminoisophthalic acid (III).

Alternatively, one can start with 3-methyl-5-nitrobenzoic acid which upon reduction is converted to 3-methyl-5-aminobenzoic acid. The latter is then halogenated to give a 2,4,6-trihalo-3-methyl-5-aminobenzoic acid (IV) which can then be acetylated to a 2,4,6-trihalo-3-methyl-5-acylaminobenzoic acid (V). In order to obtain the compounds of the invention, the acids (IV) or (V) are oxidized to the compounds of Formulas II and III, respectively.

In the halogenation step an excess of halogenating agent (at least three equivalents) is employed. The halogenating agent can be elementary bromine, elementary iodine, or any of the various halogenating agents which afford available elementary bromine or iodine. Such agents include pyridine bromide hydrobromide, N-bromoamides, iodine monochloride, potassium iododichloride ($KICl_2$, a complex of potassium chloride and iodine monochloride), the pyridine-iodine monochloride complex, and the like.

The final acylation step is carried out by heating the free amino compounds with an acid anhydride or acid halide, or with the acid itself as in the case of formic acid which does not form an acid anhydride or an acid halide. The acylation reaction is promoted by the addition of a trace of a strong acid, such as sulfuric acid, perchloric acid or an organic sulfonic acid as a catalyst; however, the reaction will still take place, although more slowly, in the absence of the catalyst.

The oxidation of the 3-methylbenzoic acids to the corresponding isophthalic acids is carried out by contacting the 3-methylbenzoic acids with an oxidizing agent. Any oxidizing agent capable of oxidizing an aromatic substituted alkyl radical to a carboxyl radical can be used. Such oxidizing agents include nitric acid; oxygen gas in butyric acid solution in the presence of a catalyst, viz. cobalt, lead or manganese acetates; and alkaline permanganate. Alkaline permanganate constitutes a preferred oxidizing agent.

The chemical structure of the compounds of the invention is established by the mode of synthesis and by chemical analysis. The nature of the starting material and the fact that the phenyl rings are completely substituted permit of no alternative structures.

The compounds of the invention where R is a lower-alkanoyl group are useful as radiopaque agents, and, in view of their low intravenous toxicity, are particularly valuable in the form of non-toxic, water-soluble salts as intravenous urographic agents or as intravenous cholecystographic agents. The members wherein the group R has from one to about three carbon atoms are urographic agents, whereas the members wherein the group R has from about four to about six carbon atoms are cholecystrographic agents.

For intravenous administration the compounds are used in the form of non-toxic salts derived from neutralization of the acids with non-toxic inorganic or organic bases, such as the alkali metal hydroxides, ammonium hydroxide, alkylamines, alkanolamines, and the like, and these salts are within the purview of the invention. The sodium salt is preferred, although the diethylamine, diethanolamine or methylglucamine salts can also be used with advantage.

The compounds of the invention are prepared for use by dissolving a water-soluble, non-toxic salt of one of the acids in a sterile aqueous medium, in the same way that presently commonly available intravenous radiopaque media, such as iodopyracet, are prepared.

The compounds of Formula I where R represents a hydrogen atom are themselves radiopaque agents, and are also useful as intermediates in the preparation of the compounds where R represents a lower-alkanoyl radical.

The following example will illustrate my invention more fully without the latter being limited thereby.

(a) 5-acetamido-2,4,6-triiodo-3-methylbenzoic acid

A solution of 18.1 g. (0.1 mole) of 3-methyl-5-nitrobenzoic acid in 280 ml. of 75% aqueous acetic acid was shaken in an atmosphere of hydrogen in the presence of platinum oxide catalyst. After the reduction was complete (about one hour), 40 ml. of 6 N hydrochloric acid was added and the mixture was filtered. To the filtrate was added with stirring 170 ml. of 2 N potassium iododichloride solution. The iodination mixture was stirred at room temperature for about forty-five minutes, and then on a steam bath for about ninety minutes. The solid product was collected by filtration, washed with water and air dried, giving 40.2 g. of crude product. The latter was dissolved in dilute ammonium hydroxide, the solution decolorized with charcoal, and the product precipitated with dilute hydrochloric acid. After the product was collected and washed with water and petroleum ether (Skellysolve B), there was obtained 38.9 g. of 5 - amino - 2,4,6-triiodod-3-methylbenzoic acid, M.P. 225–227° C. (dec.). The latter material was mixed with 120 ml. of acetic anhydride containing several drops of concentrated sulfuric acid, and the mixture was heated for two hours on a steam bath. The reaction mixure was cooled and the product was collected by filtration and washed with water and petroleum ether (Skellysolve B). The product was purified by dissolving it in dilute ammonium hydroxide, decolorizing with charcoal and precipitating with hydrochloric acid. There was thus obtained 16 g. of 5-acetamido-2,4,6-triiodo-3-methylbenzoic acid, M.P. 275° C. (dec.) (corr.).

*Analysis.*—Calcd. for $C_{10}H_8I_3NO_3$: I, 66.7. Found: I, 66.6. Neut. equiv. calcd.: 571. Found: 561.

By replacement of the acetic anhydride in the preceding preparation by an equivalent amount of formic acid (acetic anhydride also present in stoichiometric amount to take up the water formed), propionyl chloride, butyric anhydride, valeric anhydride, isovaleric anhydride, or caproyl chloride, there can be obtained, respectively, 5-formamido-2,4,6-triiodo-3-methylbenzoic acid, 5-propionamido-2,4,6-triiodo-3-methylbenzoic acid, 5-butyramido-2,4,6 - triiodo-3-methylbenzoic acid, 5-valeramido-2,4,6-triiodo-3-methylbenzoic acid, 5-isovaleramido-2,4,6-triiodo-3-methylbenzoic acid, or 5-caproamido-2,4,6-triiodo-3-methylbenzoic acid.

(b) 5-acetamido-2,4,6-triiodoisophthalic acid

A solution of 19.6 g. (0.0688 mole) of potassium permanganate and 250 ml. of water was added in portions over a period of nine hours to a solution of the sodium salt of 5-acetamido-2,4,6-triiodo-3-methylbenzoic acid (prepared from 19.6 g. (0.0343 mole) of the acid and 343 ml. of 0.1 N sodium hydroxide solution) while stirring on a steam bath. After the reaction mixture had stood at room temperature for about fifteen hours, the slight excess of potassium permanganate was destroyed by addition of a small amount of ethyl alcohol and heating. The pH of the solution was adjusted to between 7 and 8 by the addition of sodium bicarbonate, the solution was filtered, the filtrate decolorized with charcoal, and the product precipitated with concentrated hydrochloric acid. The product was collected by filtration, washed with water and acetone and dried in an oven at 100° C. for two hours. The product was purified by dissolving it in 175 ml. of dilute sodium hydroxide solution, decolorizing with charcoal, precipitating with hydrochloric acid and washing with water and petroleum ether (Skellysolve B), giving 11 g. of 5-acetamido-2,4,6-triiodoisophthalic acid, M.P. above 300° C. (corr.) with decomposition at 288° C.

*Analysis.*—Calcd. for $C_{10}H_6I_3NO_5$: I, 63.4. Found: I, 63.3. Neut. equiv. calcd.: 300.5. Found: 302.

5-acetamido-2,4,6-triiodoisophthalic acid can be treated with an aqueous solution of an equivalent amount of sodium hydroxide, potassium hydroxide, ammonium hydroxide or N-methylglucamine, and the solution concentrated to give in dry, solid form, the sodium, potassium, ammonium or N-methylglucamine salts, respectively, of 5-acetamido-2,4,6-triiodoisophthalic acid.

A 2.5 g. sample of 5-acetamido-2,4,6-triiodoisophthalic acid was dissolved in 3.85 ml. of 1.82 N sodium hydroxide solution to give 4.8 ml. of a solution of pH 7. This solution was tested for intravenous toxicity in mice and an approximate $LD_{50}$ value of 3700 mg./kg. was found. In a subsequent toxicity determination an $LD_{50}$ value of 4100±278 mg./kg. was found.

By replacement of the 5-acetamido-2,4,6-triiodo-3-methylbenzoic acid in the preceding preparation by a molar equivalent amount of 5-formamido-2,4,6-triiodo-3 - methylbenzoic acid, 5-propionamido-2,4,6-triiodo-3-methylbenzoic acid, 5-butyramido-2,4,6-triiodo-3-methylbenzoic acid, 5-valeramido-2,4,6-triiodo-3-methylbenzoic acid, 5-isovaleramido-2,4,6-triiodo-3-methylbenzoic acid, 5-caproamido-2,4,6-triiodo-3-methylbenzoic acid, or 5-amino-2,4,6-triiodo-3-methylbenzoic acid, there can be obtained, respectively, 5-formamido-2,4,6-triiodoisophthalic acid, 5-propionamido-2,4,6-triiodoisophthalic acid, 5-butyramido-2,4,6-triiodoisophthalic acid, 5-valeramido-2,4,6-triiodoisophthalic acid, 5-isovaleramido-2,4,6-triiodoisophthalic acid, 5-caproamido-2,4,6-triiodoisophthalic acid, or 5-amino-2,4,6-triiodoisophthalic acid.

This application is a division of my copending application, Serial No. 653,287, filed April 17, 1957.

I claim:

1. A process for preparing a compound having the formula

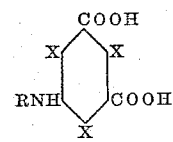

wherein R represents a member of the group consisting of hydrogen and lower-alkanoyl radicals, and X represents halogen selected from the group consisting of bromine and iodine, which comprises oxidizing a compound having the formula

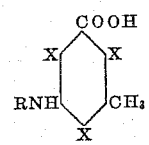

with an oxidizing agent selected from the group consisting of (A) nitric acid; (B) oxygen gas in butyric acid in the presence of a catalyst selected from the group consisting of cobalt, lead and manganese acetates; and (C) alkaline permanganate.

2. A process for preparing a compound having the formula

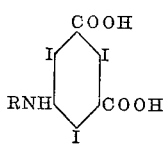

wherein R represents a lower-alkanoyl radical, which comprises oxidizing a compound having the formula

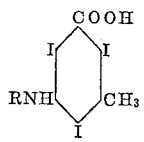

by treating it with alkaline permanganate.

3. A process for preparing 5-acetamido-2,4,6-triiodoisophthalic acid which comprises oxidizing 5-acetamido-2,4,6-triiodo-3-methylbenzoic acid by treating it with alkaline permanganate.

References Cited in the file of this patent

UNITED STATES PATENTS

| | | |
|---|---|---|
| 1,332,028 | Coblentz et al. | Feb. 24, 1920 |
| 2,479,067 | Gresham | Aug. 16, 1949 |

OTHER REFERENCES

Whitmore et al.: "J.A.C.S.," vol. 51 (1929), page 2786.